United States Patent
Hyduke et al.

(10) Patent No.: US 8,145,650 B2
(45) Date of Patent: Mar. 27, 2012

(54) NETWORK OF SINGLE-WORD PROCESSORS FOR SEARCHING PREDEFINED DATA IN TRANSMISSION PACKETS AND DATABASES

(76) Inventors: Stanley Hyduke, Henderson, NV (US);
Slawek Grabowski, Zegocina (PL);
Maciej Bis, Cracow (PL); Jacek Majkowski, Cracow (PL)

(*) Notice: Subject to any disclaimer, the term of this patent is extended or adjusted under 35 U.S.C. 154(b) by 1016 days.

(21) Appl. No.: 11/833,368

(22) Filed: Aug. 3, 2007

(65) Prior Publication Data

US 2008/0126746 A1    May 29, 2008

Related U.S. Application Data

(60) Provisional application No. 60/838,656, filed on Aug. 18, 2006.

(51) Int. Cl.
*G06F 17/30*    (2006.01)

(52) U.S. Cl. .......................... 707/755; 707/780; 715/210

(58) Field of Classification Search .................. 707/775, 707/771, 794, 798, 797, 780, 755; 715/215, 715/210; 712/213
See application file for complete search history.

(56) References Cited

U.S. PATENT DOCUMENTS

| | | | | |
|---|---|---|---|---|
| 4,298,773 A * | 11/1981 | Diab | ................................ | 178/30 |
| 4,325,117 A * | 4/1982 | Parmet et al. | .................. | 715/210 |
| 5,511,135 A * | 4/1996 | Rhyne et al. | .................. | 382/187 |
| 5,606,690 A * | 2/1997 | Hunter et al. | .................. | 715/255 |
| 5,995,922 A * | 11/1999 | Penteroudakis et al. | .......... | 704/9 |
| 6,038,560 A * | 3/2000 | Wical | ..................... | 1/1 |
| 6,392,571 B1 * | 5/2002 | Chen et al. | ....................... | 341/60 |
| 6,578,133 B1 | 6/2003 | Hyduke | | |
| 6,785,869 B1 * | 8/2004 | Berstis | .......................... | 715/210 |
| 6,915,410 B2 | 7/2005 | Hyduke | | |
| 7,539,681 B2 * | 5/2009 | Norton et al. | .......................... | 1/1 |
| 7,899,842 B2 * | 3/2011 | Boyce | ........................... | 707/780 |
| 2003/0167162 A1 | 9/2003 | Simpson et al. | | |
| 2003/0167276 A1 * | 9/2003 | Simpson et al. | .............. | 707/102 |
| 2004/0260681 A1 * | 12/2004 | Dvorak | ............................. | 707/3 |
| 2008/0010278 A1 * | 1/2008 | Kencl et al. | ....................... | 707/6 |
| 2008/0033974 A1 * | 2/2008 | Cameron | ....................... | 707/101 |
| 2011/0119304 A1 * | 5/2011 | Boyce | ........................... | 707/780 |

* cited by examiner

*Primary Examiner* — Sherief Badawi
(74) *Attorney, Agent, or Firm* — Weiss & Moy, P.C.; Jeffrey D. Moy (57) ABSTRACT

The present invention related to monitoring internet traffic for illegal Intellectual Property transfers, viruses, criminal and other illegal activities. It also assists the Internet search engine providers in generating fast and accurate responses to Internet Recipient (IR) database queries. A massively parallel network of processing units residing within a single programmable ASIC device assures speeds in excess of 100 Gigabits/second.

13 Claims, 5 Drawing Sheets

NETWORK OF SINGLE-WORD PROCESSORS FOR SEARCHING PREDEFINED DATA IN TRANSMISSION PACKETS AND DATABASES

RELATED APPLICATION

This application is related to U.S. Provisional Application Ser. No. 60/838,656, filed Aug. 18, 2006, in the name of the same inventor listed above, and entitled, "A NETWORK OF SINGLE-WORD PROCESSORS FOR SEARCHING PREDEFINED DATE IN TRANSMISSION PACKETS AND DATABASES". The present patent application claims the benefit under 35 U.S.C. §119(e).

FIELD OF INVENTION

The present invention relates to ultra-fast database inquiries and real-time monitoring of network data. In particular, the present invention relates to equipment for ultra high date rate analysis and processing of internet protocol (IP) packets to enable real-time network security applications. In addition, the equipment will allow tracking of illegal activities over networks and provide personal and intellectual property protection. The present invention facilitates ultra-fast searches of databases for specific strings of data and can be used by Internet search engine providers to respond to Internet Recipient (IR) queries with fast and precise responses.

BACKGROUND OF THE INVENTION

Internet and databases are becoming key strategic corporate and government resources that need to be protected against all kinds of cyber-crime. It is thus desirable to monitor Internet transmissions for their content and take appropriate actions when they violate corporate or government security. The present invention facilitates low cost, ultra fast packet payload analysis and database searches and provides dynamic protection on the use of specific elements of that database.

The most popular software-based internet packet analysis software is called SNORT. It includes over 2400 rules in its version 2.2, and is so slow that it cannot work effectively with the current high speed internet links. SNORT could provide some protection at the end user sites, but since end users are often careless about updating their antivirus (AV) software on a daily basis, the antivirus protection should be put into the servers and routers that operate under continuous maintenance. However, this requires that Internet packets must be processed at ultra high speeds of servers and routers. The present invention facilitates placing such ultra-fast packet payload analysis means in internet routers and servers.

The existing firewalls that check the source of messages by analyzing packet headers do not provide proper protection against many types of malware because transmissions coming from trusted websites can also be corrupted. To assure better protection, the internet packet payloads have to be also analyzed. Intrusion Detection Systems (IDS) scan packets payload for malware. In addition, there are also Intrusion Detection and Preventions Systems (IDPS) that perform both detection of malware and their removal. However, since these operations are typically performed in software, they are not suitable for acceptance at Network Aggregation Points (NAPS) and other servers, where they would be most effective. The present invention can be put into a single ASIC device to facilitate low cost, ultra fast packet payload analysis and elimination of malware at the servers and routers.

The complexity of today's technologies makes it almost impossible to monitor the flow of proprietary data out of corporations and government institutions. Now, the companies and government agencies can install inexpensive Internet payload monitoring devices, as per the present invention, which will warn and even stop the flow of confidential information out of corporations and government institutions. The present invention allows augmenting the existing firewalls with a device for controlling the flow of confidential data.

There is an explosion of abuses of intellectual property due to the ease of transmitting movies, songs, games, design software, and other copyrighted material between individuals. Ultra high speed and efficient monitoring of internet transmission for copyrighted material will slow the theft of intellectual property and stimulate creativity in many artistic, scientific and business fields. The present invention allows fast packet payload searches for strings of intellectual property.

We are becoming a society oriented towards databases that store a lot of personal data, such as health conditions, financial data, personal purchasing preferences, etc. Some of this information is crucial to individual's freedom and there have to be put strict rules on dissemination of information stored in national databases. One of the best ways to implement such restrictions on database access is using devices as per the present invention to monitor and control all downloads of such restricted information.

National security, tax evasion, and drug trafficking have become a major concern. Scamming for these criminal messages has to be conducted at multiple servers in the Internet network. The present invention allows linear, remotely controlled growth of the searched strings of data in many languages, including Kanjii, Farsi, and others.

It is therefore the object of the present invention to provide a method and apparatus for fast scanning of Internet data packets and databases for the desires strings of characters and graphic symbols.

BRIEF DESCRIPTION OF THE INVENTION

The purpose of this invention is to provide low cost, ultra-fast Internet packet payload analysis apparatus for monitoring illegal intellectual property transfers over the Internet network. The same devices can also be programmed to search for viruses, criminal messages, and to protect corporate and government databases from criminal or incidental information accessing and dissemination.

The device architecture as per the present invention is based on a network of parallel single bit processors. U.S. Pat. Nos. 6,578,133 and 6,915,410 describe a network of single bit processors that operate synchronously under control of a single clock. The current invention also uses network processors but they are single-word instead of single-bit processors, and they detect asynchronously the desired word strings in Internet traffic and database searches.

Each single-word processor is programmed to detect a single 8-bit ASCII or 16-bit Unicode character. Once that word is detected, the processor enables the output of the interconnected processor that is looking for the following word in a string of words. This way, a chain of words can be encoded in a network of processors. Each processor that finds its key word is immediately sending a so called "output enable" signal to the next processor in the chain. Should the next processor find its key word as well, it will send its own "output cable" signal to the next processor in the chain.

The processors' outputs in a processor network will be activated one by one as new words are detected. This process will continue till the desired sequence of words is detected by the network of the interconnected single-word processors.

Each processor can activate several other single-word processors' outputs, if they are processing words that form a logical OR operation on words in a string, as explained in the Example 1, below.

EXAMPLE 1

If we are searching for a key words sequence (KWS) consisting of key words:
brown (dog or Lassie) jumped over (fence or stream or bicycle), then:
Word Processor 1 (WP1) will be assigned detection of the word "brown".
Word Processor 2 (WP2) will be assigned detection of the word "dog".
Word Processor 3 (WP3) will be assigned detection of the word "Lassie".
Word Processor 4 (WP4) will be assigned detection of the word "jumped".
Word Processor 5 (WP5) will be assigned detection of the word "over".
Word Processor 6 (WP6) will be assigned detection of the word "fence".
Word Processor 7 (WP7) will be assigned detection of the word "stream".
Word Processor 8 (WP8) will be assigned detection of the word "bicycle".

The moment the WP1 processor detects the word "brown", it activates the WP2 and WP3 processors to start searching for "dog" and "Lassie", respectively. If either WP2 or WP3 detect the assigned word ("dog" or "Lassie"), they activate the WP4 processor that will start searching for "jumped". Once the word jumped has been detected, the WP4 processor will activate the WP5 processor that will start searching for the word "over". After "over" is detected, the WP5 processor will activate in parallel the WP6, WP7 and WP8 processors searching for words "fence", "stream" and "bicycle", respectively. If WP6, WP7 or WP8 detect their assigned word, they will generate message, "Detected string: brown (dog or Lassie) jumped over (fence or stream or bicycle)."

Since the key words, such as "brown", "dog", "Lassie", etc. can be interlaced with some irrelevant words, the WP2, WP3 and other processors in the network, when activated, are looking only for the specific word that they have been programmed to detect. These processors will ignore all other words, except those for which they have been programmed to locate. The processors in the network are programmed for the specific words, and the interconnections between these processors correspond to the positions of key words in the string for which the apparatus is searching.

EXAMPLE 2

If a word-processor network has been programmed for searching the text patterns in Example 1 and the string of words is as follows: "brown with white dog jumped carefully over a big fence", then the WP2 processor will ignore words "with" and "white", and will detect only the word "dog". The processor WP5 will filter out the words: "brown", "with", "white", "dog", "jumped", and "carefully", because it was programmed to detect "over". Similarly, processor WP6 will filter out the words "brown", "with", "white", "dog", "jumped", "carefully", and "over" and will detect the word "fence".

DETAILED DESCRIPTION OF THE PREFERRED EMBODIMENT

Figure 1:
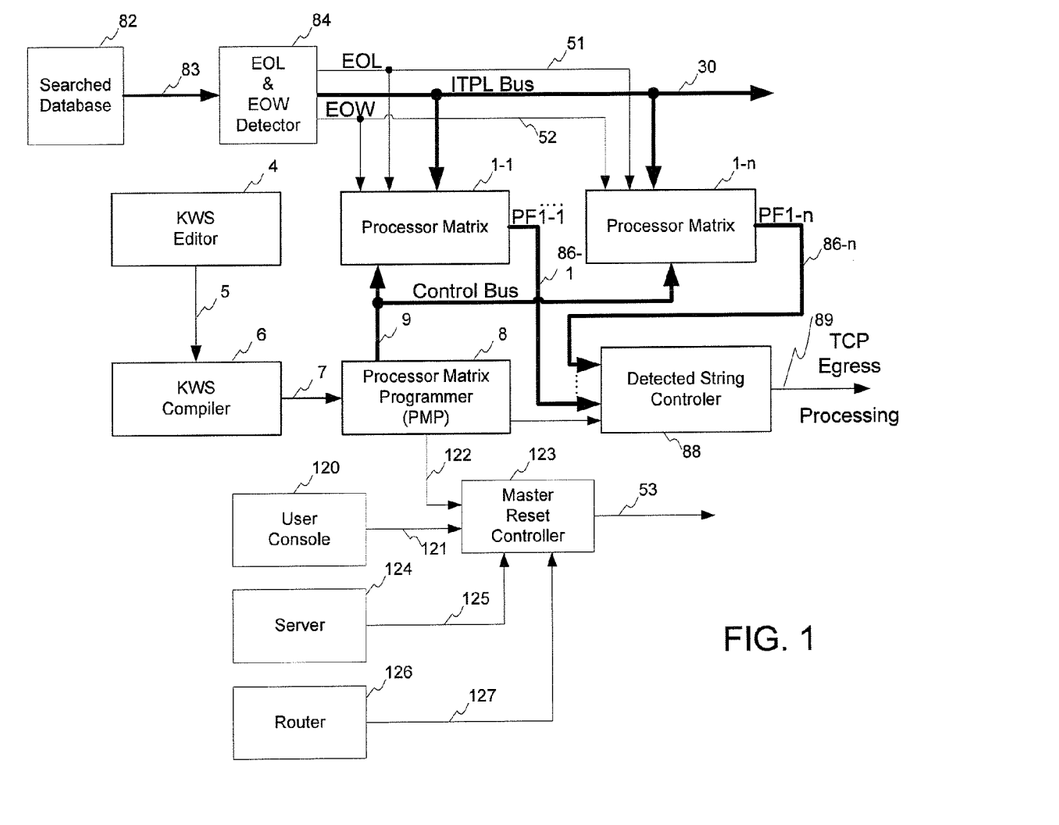
FIG. 1 depicts connections between compiler, programmer and processor networks.

The basic arrangement of processing blocks within the apparatus as per the present invention is shown in FIG. 1. The searched database 82 is typically derived from Internet packets by an Internet router or Internet server hardware. The database 82 can be stored in FIFO hardware, dual ported RAM, or other types of memory. The database 82, also called the data input means 82, feeds its contents over the signal lines 83 into the EOL & EOW detector 84. If the EOL & EOW detector 84 detects end-of-line (EOL) or end of word (EOW) characters within the data provided on its input signal lines 83, it will produce EOL signal on signal line 51 or EOW signal on signal line 52, respectively.

The key word strings (KWS) are entered into the KWS editor 4. The KWS editor 4 can be any text editor, such as provided within Active-HDL 7.1 software or the like. The text from editor 4 is fed via signal line 5 into the KWS compiler 6 that distributes the key words among the processors 22-11 through 22-*im* (FIG. 2), residing within the Processor Matrix 1-1. The algorithm for distribution of key words within a processor network can be based on various algorithms known in the field, such as simulated annealing, genetic, heuristic, "tabu search", greedy or the like.

Figure 2:
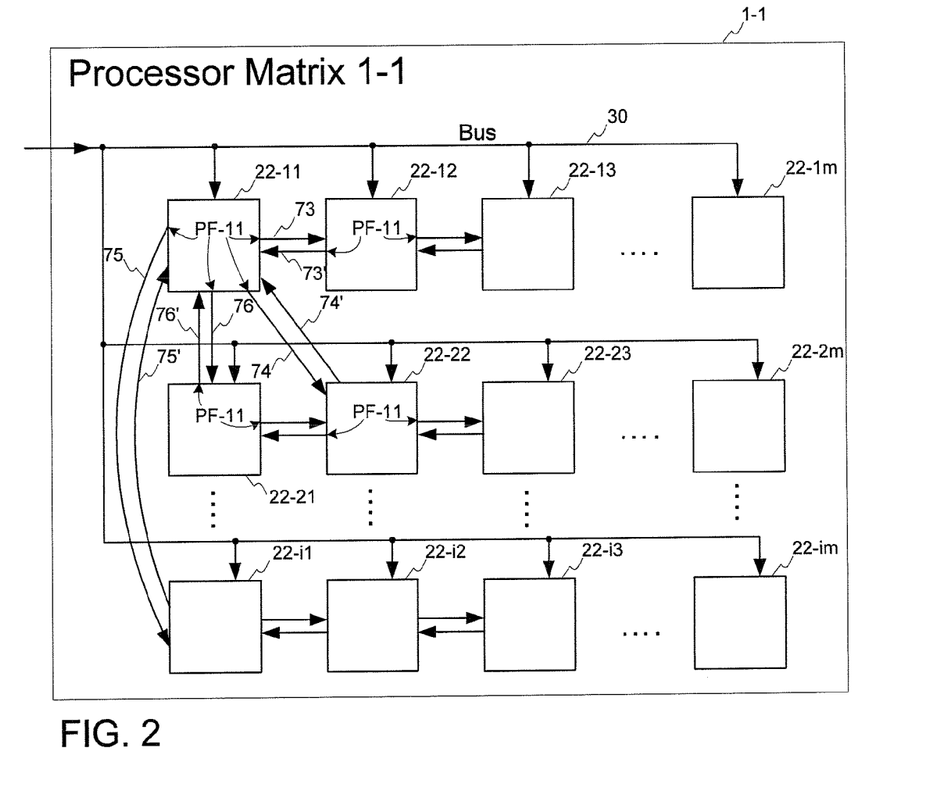
FIG. 2 shows connections between network processors and Internet bus.

Each single-word processor 22-11 through 22-*im* as shown in FIG. 2, is typically connected to eight or more of its neighboring processors and can be made as honeycomb, hexagonal, etc. connectivity structures. The connections between processors are preferably two-way, so the processors can be interconnected in various configurations. The processor connectivity is specific to the device architecture. To save on silicon area, the interconnections between processors could be bidirectional instead of two-way connections that have separate wires for each direction of signal flow. The compiler 6, after analyzing the entered keyword strings will select, which of the processors will be used, and which of the connections between processors will be enabled.

The KWS compiler 6 computes optimal distribution of key words in the single-word processors 2-11 through 22-*im*, residing within Processor Matrix 1-1. As shown in FIG. 1, a system for detecting word sequences can have multiple matrices 1-1 through 1-*n* to provide for large numbers of searched patterns. The KWS compiler 6 generates a series of ASCII character codes for key words that are then loaded into processors 22-11 through 22-*im*. The KWS compiler 6 also establishes connectivity between these processors by loading an appropriate control word into the connectivity control register CCR 44, shown in FIGS. 3 and 4. If the WP1 processor from Example 1 has been loaded into the processor 22-11 and WP2 and WP3 into processors 22-12 and 22-22, respectively, then compiler 6 will activate links between processors WP1, WP2 and WP3 by placing appropriate enable bits in the connectivity control register 44 of 22-12 and 22-22 that will enable signals provided on signal lines 73 and 74, respectively. The signals on signal lines 75 and 76 will be disabled by compiler 6, which will place appropriate disable bits in the connectivity and control register 44 of processors 22-i1 and 22-21, respectively.

Referring again to FIG. 1, the compilation results are fed via signal line 7 into PMP matrix programmer 8. The PMP matrix programmer 8 provides the compilation results via signal line 9 to local programmers 18 (FIG. 3), located within single-word processors 22-11 through 22-im, shown in FIG. 2. The local programmers 18 also control loading of ASCII characters into local data memory memories 12 (FIG. 3) of processors 22-11 through 22-im. The local programmers 18 could be combined into the processor matrix programmer 8.

Figure 3:
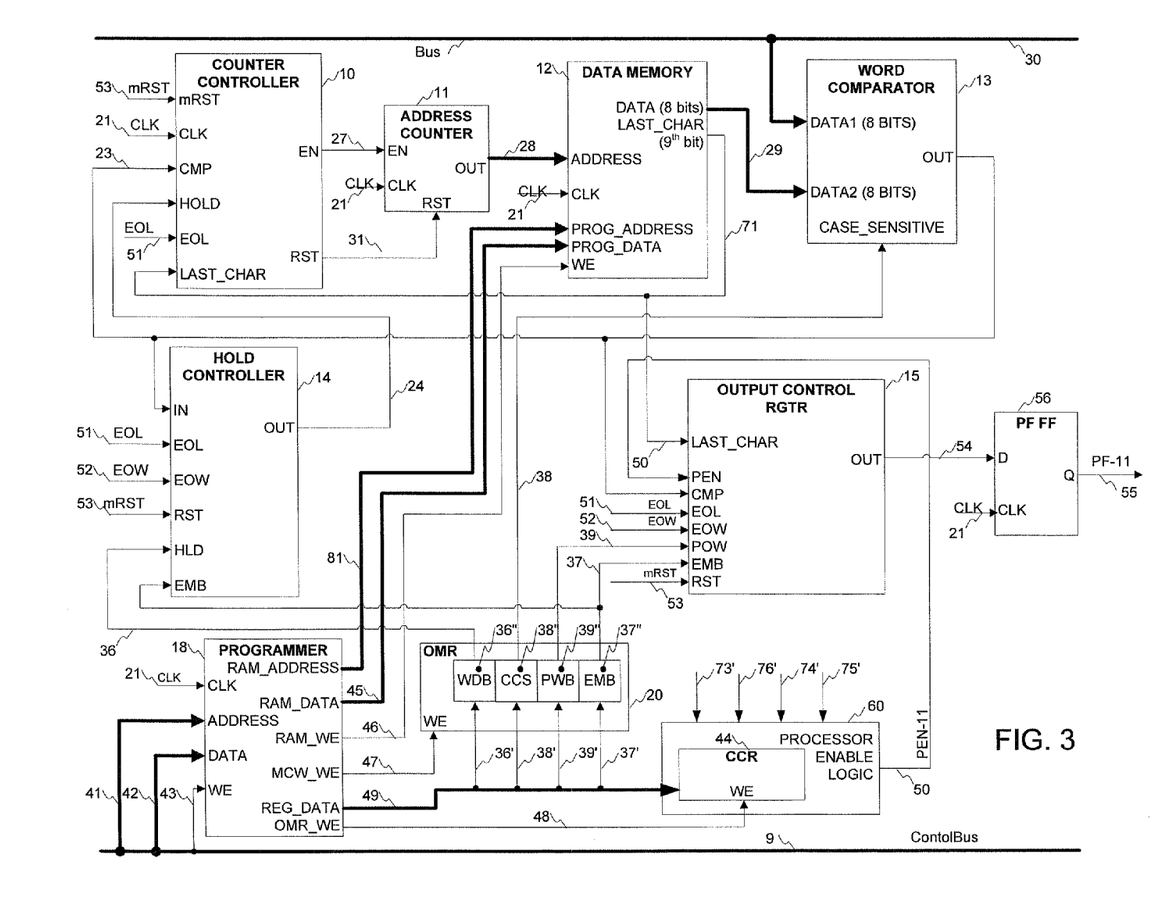
FIG. 3 illustrates a single-word processor embodiment.

The architecture of a single-word processor, such as 22-11 is shown in FIG. 3. The key elements of a single-word processor are: bus 30 that carries input data sent over the Internet or from a corporate database and which need to be scanned for key words, 4-bit address counter 11 that addresses data memory 12 storing characters of the word to be detected in the stream of data on bus 30, which is representing searched database or data input means, and comparator 13 that compares data on its signal lines 29 with data on bus 30 and issues a compare signal on signal lines 23 if a match of character has been detected.

The address counter 11 is reset by a mismatch signal produced by word comparator 13 on signal line 23, and fed via controller 10 and signal on signal line 31. If word comparator 13 is fed an active CS signal on signal line 38, then it will ignore the differences between the upper and lower cases and will produce the character detected signal between corresponding upper and lower case characters. The bit 5 in the ASCII character code differentiates between the upper and lower case. By ignoring bit 5 in the ASCII character comparison, all differences between the upper and lower case are eliminated. The detector 84 can perform Unicode mapping and provide appropriate characters on bus signal line 30.

The key word to be detected by processor 22-11 is stored in its data memory 12. Each letter or character of a key word, such as "brown" will be stored in the sequential order of their 8-bit ASCII character code representation. The 9th bit in the data memory 12 denotes the last character of the key word stored in data memory 12. Detection of the $9^{th}$ bit sends a signal on signal line 71 that causes resetting of address counter 11 by counter controller 10.

In the initial state, data memory 12 produces on its output signal line 29 the first letter or character of the key word that the processor 22-11 has been programmed to detect. This character will be compared continuously within the word comparator 13 with the string of characters provided on bus line 30, representing the searched database. Should a match occur, word comparator 13 will produce character detected signal on signal line 23. The counter controller 10 is responsive to character detected signal on signal line 23 and produces a signal on its output signal line 27 that enables address counter 11 to increment its count by one on the next clock edge, provided on signal line 21. As a result, counter 11 will be addressing the next character of the key word stored in data memory 12. If the comparator 13 detects different characters on its 28 and 30 inputs it will generate character miss-detected signal on signal line 23. Responding to character miss-detect signal, counter controller 10 will reset address counter 11 via signal line 31, unless bits WDB 36" and EMB 37" in register 20 are set active, as will be explained below in reference to FIG. 3.

There are many ways to implement programmer 18. One of the programmer 18 implementations is shown in FIG. 3. The programmer 18 is responsive to signals 41, 42, and 43, all being part of the bus signal line 9, generated by the processor matrix programmer 8. The signal line 41 provides addresses of characters in data memory 12, selects operational mode register 20 and connectivity control register 44. The signal line 42 provides data to be written into data memory 12, operational mode register 20 and connectivity control register 44. The write enable signal on signal line 43 is converted by programmer 18 into memory write enable signal on signal line 46, register 20 enable signal on signal line 47 and register 44 enable signal on signal line 48. The enable signals on signal lines 46, 47, and 48 are preferably clocked with clock signal on signal line 21.

Responding to data on signal lines 41 and 43, the programmer 18 issues load signals 46, 47, and 48 that load data from signal lines 42 into data memory 12, operational mode register 20 and connectivity control register 44, respectively.

Responding to the user setups, compiler 6 writes appropriate control bits into operational mode register 20 that stores WDB or word discontinuity bit 36", CCS or character case sensitivity bit 38", PWB or partial word bit 39" and EMB or embedded word bit 37".

Very often, senders of malicious or criminal messages try to avoid detection of key words by intermixing lower and upper case letter in the same word. The user of the device built as per present invention can request compiler 6 to ignore the difference between the upper and lower case characters. In such a case compiler 6 will enable bit CCS 38" in the OMR operational mode register 20, via signal line 7, processor matrix programmer 8, bus signal line 9 and programmer 18, located within the processor 22-11 in FIG. 3.

The WDB data on signal line 36 allows detection of key words despite some incorrect characters inserted anywhere in the key word. For example, the word s?t%c#@a!1*i&ng can still be detected as the word stealing. To accomplish this, the controller 14, which is being responsive to the WDB signal on signal line 36 and character mismatch signal on signal line 23, issues a HOLD signal on signal line 24 that stops counter controller 10 from resetting the address counter 11 for one character mismatch signal sent over signal line 23. Only when there are two consecutive character mismatches sent over signal line 23, the hold controller 14 will send a signal over signal line 24 that will cause the counter controller 10 to reset the address counter 11.

For example, if the second letter on the signal line 30 is not the same as the second letter of the key word in data memory 12 fed on signal line 29, then the signal on signal line 23 will activate the hold controller 14, which will put on hold any action by controller 14 till the arrival of the third character on signal line 30. If the third character on signal line 30 is identical to the second character in data memory 12, then hold controller 14 will advance the counter 11 via output signal line 24, counter reset controller 10 and its output signal line 27. However, if the third character on signal line 30 is not identical to the second character in data memory 12, the counter 11 will be reset by the hold controller 14 via signal line 24, counter controller 10 and reset line 31. After the counter 11 is reset via signal line 31, it addresses the first character of the key word in data memory 12, and the search for the key word will start anew. The hold controller 14 may be programmed to skip two or more incorrect characters on signal line 30 instead of one incorrect character as described above.

Some criminals may attempt to hide key words of a message by embedding it within other words. The EMB bit 37" within operation mode register 20 will instruct controller 14 to search for embedded words. For example, it will detect the word cat in tomcat, concatenation, etc. In such a situation, controller 14 allows detection of key word starting from a character other than space, and allowing a key word to end on other character than space. The embedded character mode will also detect a word, which character may reside in several consecutive words. For example, apparatus built as present invention will detect key words "steal money" in the sentence steam locomotives are newer than yachts. This mode terminates search of the specific key word only after an end-of-line or 'period' character has been detected.

The search for the embedded characters is facilitated by the present invention because all single-word processors are running all the time. The controller 14 controls the operation of the single word processor via signal line 24. The EMB bit 37" in register 20 allows detection of key words that are embedded in other words. Responding to the EMB signal on signal line 37, controller 14 can start detection of a key word without the presence of a space character before or after the key word. The controller 14 also will prevent counter controller 10 from resetting address counter 11 on character mismatches provided on signal line 23. Only EOL signal on signal line 51 or master reset mRST on signal line 53 will terminate the search for the key word by controller 14. In its standard mode of operation, with the EMB bit 37" inactive in OMR register 20, the controller 14 will look for key words having a space character before and after the searched key word.

Some languages such as German are known for long strings of letters in a word. Also some viruses have very long strings of characters. However, the optimal solution was found to use 16-character word detection processors in typical implementations. To accommodate a word with more than 16 characters, the KWS compiler 6 is splitting each long word into a set of characters that fit within the single-word processors. For example compiler 6 may divide a long word into a set of 16-character entities and feeds them into separate single-word processors 22-11 through 22-im like they were separate words. For compiler's simplicity, it is desirable that all these 16-character words be located within the same processor matrix 1-1 or similar.

The compiler 6 sets the partial word PWB bit 39" in OMR register 20 via signal line 7, processor matrix controller 8, signal line 9 and programmer 18, in a manner described above in reference to bits CCS 38", WDB 36", and EMB 37" in register 20. All partial words generated by compiler 6 from a very long word, with the exception of the last word, have the PWB bit 39" in register 20 set active.

Figure 4:
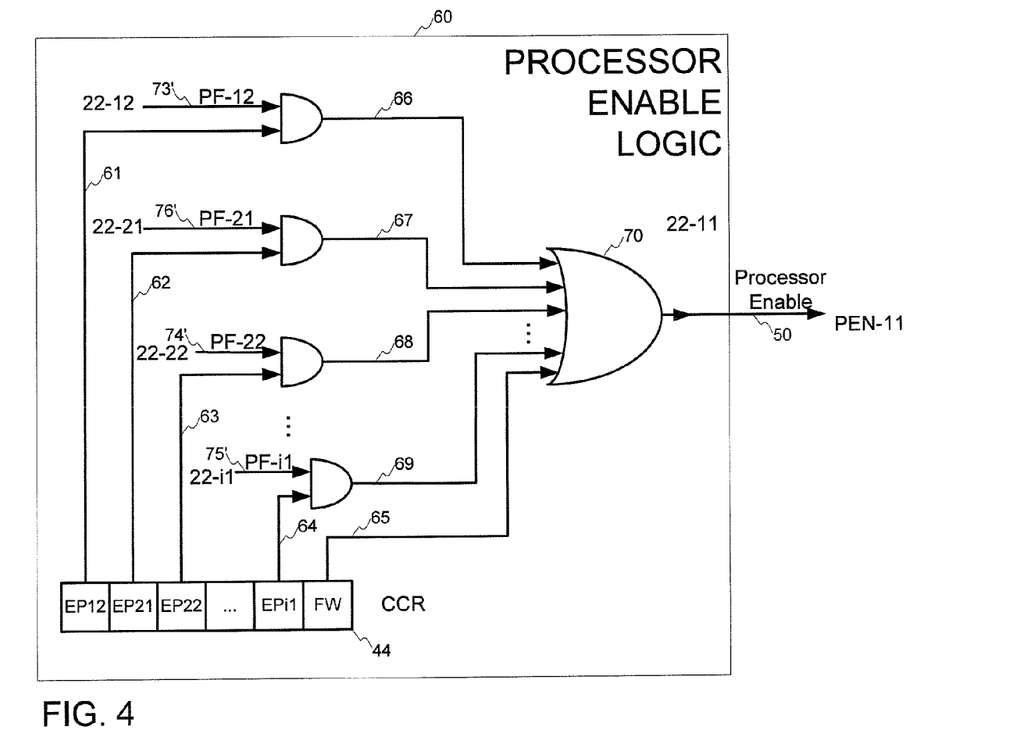
FIG. 4 show processor's output enable logic.

For words with 16 characters of less, EOW signal on signal line 52 is inactive, and it does not reset the PF flip-flop 56 via output control register 15 and signal line 54. However, if the PWB bit 39" is active, denoting that a partial word is being processed by single-word processor, then EOW signal on signal line 52 will reset PF flip-flop 56 via control register 15 and signal line 54.

The last section of a long word split into shorter words will have PWB bit 39" set inactive by compiler 6. This will inhibit resetting of PF flip-flop 56 by the EOW signal provided on signal line 52. For example, the TV-videocassette recorder long word will be split by compiler 6 into 2 words: TV-videocassette and recorder. If data means 82 provide on signal bus 30 sequences of words: TV-videocassette recorder, then EOW space character after the first word TV-videocassette will reset PF flip-flop 56 of processor handling this word. The processor handling the recorder word will not be activated because PF flip-flop 56 of the preceding processor handling TV-videocassette will be already reset by the 'space' or EOW signal appearing before the word recorder.

The processors 22-11 through 22-im in FIG. 2 are having two-way connections with other processors in the processor matrix 1-1. For example, processor 22-11 is connected with processor 22-12 with signal lines 73 and 73'. The signal line 73 conducts signals from processor 22-11 to 22-12 and 73' conducts signals in the opposite direction. Similarly, 22-11 is connected with 22-21 by means of signal lines 76 and 76'. The connections between processors 22-11 through 22-im are generally limited to eight neighboring processors to save on silicon area. However, the larger the number of connections, the greater the flexibility of the processor matrix 1-1, and two-way connectivity with 64 neighboring processors in large processor matrices would be desirable. The neighboring processors are connected to processor 22-11 via signal lines 73' 74', 75' and 76'. If PW1 is the first processor handling a string of words, and it if has been loaded into processor 22-11, compiler 6 will set the FW bit in register CCR 44 of processor 22-11 to its active state. The bits EP12, EP21, EP 22, etc. in register 44 will all be disabled as the associated with them processors 22-12 through 22-im do not have any influence over the operation of the first processor 22-11 in a word string.

To set up the connectivity between processors 22-11 through 22-im, compiler 6 analyzes the entered key-word patterns into KWS editor 4 and creates a set of enable bits EP12 through EPin for each processor in the processor matrix 1-1 that will activate certain links between processors as described above in reference to FIG. 4. Next, compiler 6 will send the E12 through EPin data through signal line 7, matrix programmer 8, signal line 9 and processor programmer 18, which will download these bits into the CCR connectivity control register 44, in the corresponding processors 22-1 through 22-im.

If the processor 22-11 is the first processor in the chain, then the FW bit in the connectivity control register 44 will be set high by compiler 6 during the system setup. If the FW bit is set high, a logic 'one' will be fed via signal line 65 to the OR logic gate 70, and will produce on its output logic 'one' that will be fed as signal PEN-11 via signal line 50 to the pattern found controller 15. If a single-word processor is the first in a chain of words, its output will have no dependencies on other single-word processor outputs.

FIG. 4 depicts how the enable bits EP12 through EPi1 generate the processor's 22-11 PEN-11 enable signal and provide it on signal line 50, which in turn enables output control register 15 of processor 22-11. If register 15 receives in addition active signal on signal line 71 that carries the last character signal, signal on signal line 23 that carries the character detected signal and signal on signal line 52 that carries the EOW signal, then output control register 15 will activate via signal line 54 the pattern found PF flip-flop 56. An active PF-11 output signal, provided by PF flip-flop 56 on signal line 55 indicates that the single-word processor 22-11 has detected the key word it was searching for. In our example, signal PF-11 is sent over signal line 73 to processor 22-12 that is looking for "dog" and to processor 22-22, which is looking for "Lassie". The signal PF-11 will be used within block 60 of processor 22-12 to enable its output control register 15 over the internal signal line 50.

If signal on signal line 71 indicates the last character present, and signal on signal line 23 indicates character match but PEN-11 signal on signal line 50 is inactive then the pattern found controller 15 does not set the PF flip-flop 56. If signal on signal line 71 indicates the last character present, and signal on signal line 23 indicates character match then controller 10, in response to signals on those two signal lines, will reset the address counter 11 via signal line 31.

The $9^{th}$ bit in data memory 12 indicates the last character of the searched of word. If there is a character match detected by word comparator 13 and the $9^{th}$ bit in data memory 12, sent over signal line 71 is inactive, then it is not end of the word, and controller 10 will advance the address counter 11 by count of one via signal line 27, to address the next character stored in memory 12. However, if EOL signal on signal line 51 is active, controller 10 will reset address counter 11 via signal line 31.

If the character comparator 13 detects a match between character provided on signal lines 29 and 30, it issues a character match signal on signal line 23. If the $9^{th}$ bit in data memory 12 indicates the last character of the word, and the PEN-11 signal on signal line 50 is active, then the pattern found controller 15 will set the PF flip-flop 56 on via signal line 54. If the $9^{th}$ bit in the data memory 12 is active, it will also force, via signal line 23, the counter controller 10 to reset the address counter 11 via signal line 31, and counter 11 will address the first character in data memory 12.

Figure 5:
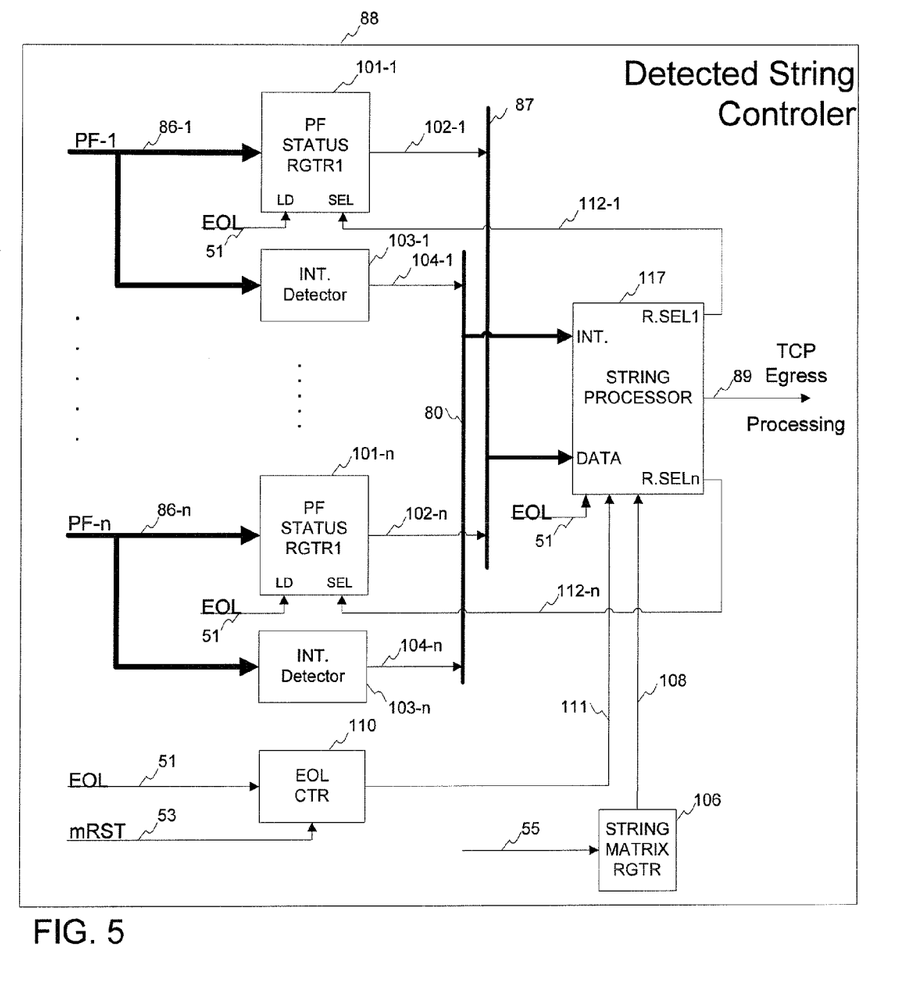
FIG. 5 depicts detection of a key words string by processor matrix.

Once enabled, the PF signals remain active till EOL end-of-line signal is detected. In typical applications, the PF signals from all processors in processor matrix 1-1 are connected to the PF status register 101-1 through 101-*n*. The EOL signal on signal line 51 loads the PF signals on signal lines 86-1 through 86-***n* into the PF status registers 101-1 through 101-*n*.

The EOL signal on signal line 51 also activates string processor 117, which reads the outputs of registers 101-1 through 101-*n*, provided via signal lines 102-1 through 102-*n*. The signals on signal lines 101-1 through 102-*n* can be read as independent signal lines, via a multiplexer built into the input of processor 117. The signal lines 102-1 through 102-*n* can be combined into a tristate bus 87 and then fed into processor 117.

Responding to EOL signal on signal line 51, the strings processor 117 also reads the status of EOL counter 110, provided on signal line 111 and status of strings matrix register 106 provided on signal line 108. The string matrix 106 responds to signals on signal lines 55 and records, which word strings have been detected. The EOL counter provides information how many end of line characters have been detected, and which sentence is being currently processed. The string matrix register 106 provides information where PF signals from each processor 22-11 through 22-*im* reside. This data allows the processor 117 to determine, which key word strings and in which sentences have been detected, and feed this information on signal line 89 to TCP Egress processing blocks that will determine what to do with the detected strings.

The processor matrix controller 8 enables via signal on signal line 122 the master reset controller 123. The enable signal on signal line 122 is generated by processor matrix programmer 8 upon completion of programming the processor matrices 1-1 through 1-*n*. The user console 120 generates user-activated signal on signal line 121, which forces controller 123 to generate mRST signal on signal line 53. A server 124 or router 126 that acquired new strings of data for analysis can generate reset signals on signal lines 125 and 127, respectively, which force master reset controller 123 to generate the master reset signal mRST on signal line 53.

There are many ways to save on the number of signal lines 102-1 through 102-*n*. For example, only selected processors 22-11 through 22-*im* could be allowed to be the top processor in a string of processors and generate the PF signal on their signal lines 55. In such a case, compiler 6 would distribute words for single-word processors starting from the top of the string.

Still another way to save on wiring is to have all PF signals grouped into registers 102-1 through 102-*n* and activate their tri-state outputs 102-1 through 102-*n* onto bus 87 fed into processor 117. Upon detection of the EOL signal, the processor 117 could activate register 101-1 through 101-*n* outputs via signal lines 112-1 through 112-*n*.

To speed processing of PF signals provided on signal lines 86-1 through 86-*n*, the apparatus can have interrupt detection circuits 103-1 through 103-*n* that are associated with signal lines fed into the registers 101-1 through 101-*n*. The interrupt circuits 103-1 through 103-*n* can sense the status of signal lines 86-1 through 86-*n* and instruct processor 117, via signal lines 104-1 through 104-*n*, which registers 101-1 through 101-*n* should be read. To simplify the drawing, signal lines 104-1 through 104-*n* are shown combined into a bus signal line 80 that is entering the Interrupt port of string processor 117.

Prompted by interrupt signals on signal lines 104-1 through 104-*n*, the processor 117 can feed the tri-state outputs of registers 101-1 through 101-*n* into bus 87 by issuing proper select signals on signal lines 112-1 through 112-*n*. The outputs of register 101-1 through 101-*n* contain the detected word string information to be further processed by string processor 117 and then provided on signal line 89 to TCP Egress Equipment controlling flow of Internet data.

To simplify explanation of the subject matter, searched database 82 represents such data means as Internet traffic or corporate database. Similarly, the EOL detector 84 represents a circuit that detects specific characters in the Internet packets or in corporate database. It can be end-of-line, end-of-word or any other character that users of apparatus built as present invention may wish to incorporate into the character string detection process. Specifically, the users may add schemes to detect excessive number of EOL signals, or they may use other characters than end of line for marking sentences and groups of words subject to analysis. The present invention allows all these changes to be added by manufacturers of the apparatus built as per the present invention.

An apparatus built as the present invention allows adding even more complex word string search capabilities than described above. There can be also made some simplifications for reduced functionality equipments. However, if any such apparatus is based on the single-word processor networks and it applies the general spirit of the present invention, it will fall within the scope of the present invention.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A device for searching predefined data in transmission packets and databases comprising:
   an End of Word (EOW) detector device coupled to a data stream input for receiving the data stream;
   at least one processor matrix coupled to the EOW detector, the at least one processor matrix having a plurality of single word processor devices, wherein each of the plurality of single word processor devices is interconnected to another single word processor device of the plurality of single word processor devices, the plurality of single word processor devices programmed to detect predefined words from the data stream input, the processor matrix sending a match signal to indicate when a string of the predefined words has been found, and wherein each single word processor device has an operational mode register having a Word Discontinuity Bit (WDB) and Embedded Bit (EMB), the WDB when set allowing each single word processor device to detect one of the predefined words programmed into the single word processor device even with character mismatches, the EMB when set allowing each single word processor device to detect specified embedded words within the predefined word programmed into the single word processor device; and a processor matrix programming unit to program the single word processors to detect the predefined words.

2. A device for searching predefined data in transmission packets and databases comprising:

an End of Line (EOL) detector device coupled to a data stream input;

at least one processor matrix coupled to the EOL detector, the at least one processor matrix having a plurality of single word processor units, wherein each of the plurality of single word processor units is interconnected to another single word processor unit of the plurality of single word processor units, the plurality of single word processor units programmed to detect predefined words from the data stream input, the processor matrix sending a match signal to indicate when a string of the predefined words has been found, wherein each single word processor unit has a Word Discontinuity Bit (WDB) and Embedded Bit (EMB), the WDB when set allowing each single word processor unit to detect one of the predefined words programmed into the single word processor unit even with character mismatches, the EMB when set allowing each single word processor unit to detect specified embedded words within the predefined word programmed into the single word processor device; and a processor matrix programming unit to program the single word processors to detect the predefined words.

3. A device for searching predefined data in transmission packets and databases in accordance with claim 1 comprising in addition:

an End of Line (EOL) detector coupled to a data stream input;

at least one processor matrix coupled to the EOW and EOL detectors, the at least one processor matrix having a plurality of single word processors, wherein each of the plurality of single word processors is interconnected to another single word processor of the plurality of single word processors, the plurality of single word processors programmed to detect predefined words from the data stream input, the processor matrix sending a match signal to indicate when a string of the predefined words has been found; and a processor matrix programming unit to program the single word processors to detect the predefined words.

4. A device for searching predefined data in transmission packets and databases in accordance with claim 3 wherein at least two processors of the plurality of single word processors are interconnected with each other bi-directionally.

5. A device for searching predefined data in transmission packets and databases in accordance with claim 3 wherein the processor matrix programming unit comprises:

a Key Word String (KWS) editor for entering the predefined words as textual data; a KWS compiler coupled to the KWS editor to convert the textual data to character codes and to establish enablement between the plurality of single word processors; and a Processor Matrix Programmer coupled to the KWS compiler and programming the plurality of single word processors of the at least one processor matrix with the character codes to detect the predefined words and to establish enablement between the plurality of single word processors.

6. A device for searching predefined data in transmission packets and databases in accordance with claim 5 wherein the KWS compiler converts the textual data to ASCII character codes.

7. A device for searching predefined data in transmission packets and databases in accordance with claim 3 wherein each of the plurality of single word processors comprises:

a data memory to store one of the predefined words;

a comparator coupled to the data memory to compare the predefined word stored in the data memory to the data stream input; and an address counter coupled to the data memory.

8. A device for searching predefined data in transmission packets and databases in accordance with claim 5 wherein each of the plurality of single word processors further comprises an operation mode register (OMR) for storing search command bits.

9. A device for searching predefined data in transmission packets and databases in accordance with claim 8 wherein the operation mode register (OMR) stores a case sensitivity bit to ignore difference between the upper and lower case characters.

10. A device for searching predefined data in transmission packets and databases in accordance with claim 8 wherein the operation mode register (OMR) stores a word detection bit that allows detection of the predefined word having at least one incorrect character inserted anywhere in the predefined word.

11. A device for searching predefined data in transmission packets and databases in accordance with claim 8 wherein the operation mode register (OMR) stores a partial word bit, the partial word bit indicating that the predefined word stored has been divided into multiple words stored in multiple single word processors.

12. A device for searching predefined data in transmission packets and databases in accordance with claim 7 wherein each of the plurality of single word processors further comprises a local program module for loading the predefined word into the data memory.

13. A device for searching predefined data in transmission packets and databases in accordance with claim 7 wherein each of the plurality of single word processors further comprises processor enable logic, wherein the processor enable logic has an enable register to store bits to enable associated single word processors.

* * * * *